US012132272B2

(12) United States Patent
Wang

(10) Patent No.: US 12,132,272 B2
(45) Date of Patent: Oct. 29, 2024

(54) HIGH RELIABILITY CARD EDGE CONNECTOR WITH BOTTOM SEAL

(71) Applicant: Amphenol East Asia Electronic Technology (Shenzhen) Co., Ltd., Shenzhen (CN)

(72) Inventor: Xiang Wang, Shenzhen (CN)

(73) Assignee: Amphenol East Asia Electronic Technology (Shenzhen) Co., Ltd., Shenzhen (CN)

( * ) Notice: Subject to any disclaimer, the term of this patent is extended or adjusted under 35 U.S.C. 154(b) by 351 days.

(21) Appl. No.: 17/627,627

(22) PCT Filed: Jul. 19, 2019

(86) PCT No.: PCT/CN2019/096746
§ 371 (c)(1),
(2) Date: Jan. 14, 2022

(87) PCT Pub. No.: WO2021/012080
PCT Pub. Date: Jan. 28, 2021

(65) Prior Publication Data
US 2022/0263260 A1 Aug. 18, 2022

(51) Int. Cl.
*H01R 12/73* (2011.01)
*H01R 13/52* (2006.01)
*H01R 12/58* (2011.01)

(52) U.S. Cl.
CPC ....... *H01R 12/737* (2013.01); *H01R 13/5202* (2013.01); *H01R 13/521* (2013.01); *H01R 12/58* (2013.01)

(58) Field of Classification Search
CPC .... H01R 12/737; H01R 12/72; H01R 12/721; H01R 12/732; H01R 12/73; H01R 12/58;
(Continued)

(56) References Cited

U.S. PATENT DOCUMENTS 3,539,975 A * 11/1970 Donna .................. H01R 12/75 439/634
4,586,254 A * 5/1986 Ammon ............... H01R 12/721 439/59
(Continued)

FOREIGN PATENT DOCUMENTS

CN 202434775 U 9/2012
CN 203242784 U 10/2013

OTHER PUBLICATIONS

International Search Report and Written Opinion mailed Apr. 22, 2020 in connection with International Application No. PCT/CN2019/096746.
(Continued)

*Primary Examiner* — Harshad C Patel
(74) *Attorney, Agent, or Firm* — Wolf, Greenfield & Sacks, P.C.

(57) ABSTRACT

A card edge connector with a seal member that blocks migration of vaporized flux into the connector. The connector includes conductive elements curved at locations and a housing to hold the conductive elements. The housing has openings on a board facing surface. The openings are sized to allow conductive elements inserted into the housing through the openings. Vaporized flux entering the connector through the openings during board assembly may accumulate on contact surfaces of the conductive elements and cause failures to read a card inserted in the connector. The seal member may be attached to the board facing surface of the housing.

20 Claims, 17 Drawing Sheets

(58) Field of Classification Search
CPC ... H01R 13/5202; H01R 13/52; H01R 13/521
USPC ............... 439/634, 630, 637, 59, 60, 61, 62, 439/607.31, 607.39, 629
See application file for complete search history.

(56) References Cited

U.S. PATENT DOCUMENTS

| | | | | |
|---|---|---|---|---|
| 6,419,503 | B1 * | 7/2002 | Choy | H01R 12/724 439/79 |
| 6,551,116 | B1 * | 4/2003 | Liu | H01R 12/712 439/79 |
| 6,638,104 | B2 * | 10/2003 | Hashimoto | H01R 12/707 439/573 |
| 6,923,662 | B2 * | 8/2005 | Sasame | H01R 12/707 439/954 |
| 6,979,206 | B2 * | 12/2005 | Bu | H01R 12/721 439/79 |
| 7,108,554 | B2 * | 9/2006 | Huang | H01R 13/6594 439/378 |
| 7,114,693 | B1 * | 10/2006 | Olgado | H01L 21/67742 248/637 |
| 7,210,955 | B2 * | 5/2007 | Ringler | H01R 12/585 439/381 |
| 7,252,523 | B1 | 8/2007 | Pennypacker et al. | |
| 7,473,140 | B2 * | 1/2009 | Guan | H01R 12/721 439/637 |
| 7,717,721 | B2 | 5/2010 | Wu et al. | |
| 8,550,854 | B2 | 10/2013 | Okano et al. | |
| 8,814,580 | B2 | 8/2014 | Shen et al. | |
| 9,240,640 | B2 * | 1/2016 | Shen | H01R 12/7029 |
| 10,193,253 | B2 * | 1/2019 | Li | H01R 12/83 |
| 10,224,653 | B2 | 3/2019 | Niu et al. | |
| 2008/0176432 | A1 | 7/2008 | Scherer et al. | |
| 2009/0186501 | A1 | 7/2009 | Kao | |
| 2019/0190212 | A1 * | 6/2019 | Fang | H01R 13/646 |

OTHER PUBLICATIONS

International Preliminary Report on Patentability mailed Feb. 3, 2022 in connection with International Application No. PCT/CN2019/096746.

* cited by examiner

HIGH RELIABILITY CARD EDGE CONNECTOR WITH BOTTOM SEAL

CROSS-REFERENCE TO RELATED APPLICATIONS

This application is a 35 U.S.C. § 371 National Phase filing of International Application No. PCT/CN2019/096746, filed on Jul. 19, 2019, entitled “HIGH RELIABILITY CARD EDGE CONNECTOR WITH BOTTOM SEAL.” The entire contents of this application is incorporated herein by reference in their entirety.

TECHNICAL FIELD

This patent application relates generally to interconnection systems, such as those including electrical connectors, used to interconnect electronic assemblies

BACKGROUND

Electrical connectors are used in many electronic systems. It is generally easier and more cost effective to manufacture a system as separate electronic assemblies, such as printed circuit boards (“PCBs”), which may be joined together with electrical connectors. Conducting traces in the PCB may be electrically connected to signal conductors in the connectors so that signals may be routed through the connectors to components on or connected to the PCBs. A known arrangement for joining several PCBs is to have one PCB serve as a backplane or a motherboard. Other PCBs, called “daughterboards” or “daughtercards”, may be connected through the backplane or to the motherboard. As a specific example, a computer system may be assembled with a processor on a motherboard and memory on a daughterboard, connected to the motherboard through a connector.

In some systems, the connected PCBs may both have connectors, which mate to form electrical connections. For example, both a backplane and daughtercards connected to it may also have connectors, and a connector mounted on a daughtercard may be plugged into a connector mounted on the backplane or motherboard.

Alternatively, daughtercards may include contacts at an edge and can be directly connected to backplane or motherboard connectors. In this configuration, card edge connectors mounted on the backplane or motherboard have slots into which the edges of the daughtercards are inserted. Compliant terminals in the connectors engage the contacts of the cards. As an example, a motherboard of a computer may have one or more card edge connectors mounted to it, such as using through hole or surface mount soldering techniques. To increase the amount of memory in the computer, a daughtercard, to which multiple memory chips are mounted, may be inserted into one of these card edge connectors.

BRIEF SUMMARY

Aspects of the present disclosure relate to high reliability card edge connector.

Some embodiments relates to a connector comprising a plurality of conductive elements comprising contact tails configured to mount to a printed circuit board, a housing comprising a face configured to face the printed circuit board and a plurality of passages holding the plurality of conductive elements, the plurality of passages comprising openings in the face, the openings having an area larger than a cross-sectional area of a contact tail extending out of a respective opening; and a member attached to the face of the housing, the member comprising portions sized and positioned to cover portions of respective openings that are not occupied by a conductive element.

In some embodiments, the housing comprises first and second walls, each elongated in a longitudinal direction, and a slot between the first and second walls shaped to receive an edge of a card, and the first and second walls comprise the plurality of passages.

In some embodiments, the plurality of conductive elements are disposed in first and second rows along a longitudinal direction. The member has a length in the longitudinal direction and a width along a lateral direction perpendicular to the longitudinal direction.

In some embodiments, the width of the member along at least half of the length of the member is substantially equal to a distance between the first and second rows at the face of the housing.

In some embodiments, the plurality of conductive elements bend in the lateral direction adjacent to the face of the housing.

In some embodiments, the member comprises a plurality of recesses positioned to receive portions of the plurality of conductive elements bent in the lateral direction adjacent to the face of the housing. The plurality of recesses are sized to receive the bent portions of the plurality of conductive elements such that the member impedes vaporized flux into the passages through the openings on the surface of the housing.

In some embodiments, the member comprises a plurality of recesses positioned to receive portions of the plurality of conductive elements bent in the lateral direction adjacent to the face of the housing. The plurality of recesses are sized to receive the bent portions of the plurality of conductive elements with an average spacing between the member and the conductive elements of 0.05 mm or less.

In some embodiments, the plurality of conductive elements comprise contact portions curving inwardly relative to the slot. The openings in the face of the housing are sized to enable the contact portions pass therethrough.

In some embodiments, the plurality of conductive elements comprise intermediate portions between the contact portions and the contact tails. The intermediate portions engage respective passages.

In some embodiments, the intermediate portions of the conductive elements extend across a width of a side of the passages. The contact portions of the conductive elements are narrower than the width of the side of the passages such that the contact portions of the conductive elements can flex in the lateral direction when a card is inserted in the slot. The contact tails of the conductive elements are narrower than the width of the side of the passages.

In some embodiments, the member comprises a plurality of projections extending into the passages through the openings at the surface of the housing such that the member is attached to the surface of the housing with a gap not greater than 0.05 mm between the member and the surface of the housing.

In some embodiments, the face of the housing comprises a standoff comprising a surface parallel to the face. The member comprises a surface flush with the surface of the standoff.

Some embodiments relate to a method of manufacturing a connector comprising a housing and a plurality of conductive elements held in the housing, the housing comprising a face configured to face a printed circuit board and a plurality of passages, the plurality of passages comprising openings in the face. The method comprises inserting the plurality of conductive elements into passages of the housing such that contact tails of the plurality of conductive elements extend out of openings in the face, and attaching a member to the housing such that the openings in the face are at least partially covered.

In some embodiments, the method comprises engaging intermediate portions of the plurality of conductive elements with bounding walls of the passages in the housing, wherein the engaging of the intermediate portions of the plurality of conductive elements occurs before attaching the member.

In some embodiments, attaching the member comprises aligning edges of the member with the contact tails of the plurality of conductive elements extending out of the face of the housing.

In some embodiments, attaching the member comprises clipping projections of the member into respective passages of the housing through respective openings on the surface of the housing such that the member is attached to the housing with a gap not greater than 0.05 mm between the member and the housing.

In some embodiments, the plurality of conductive elements comprise intermediate portions in a plane perpendicular to the face and contact portions extending from the intermediate portions and curving out of the plane by a first distance in a first direction. The passages have a dimension in the first direction smaller than the first distance.

In some embodiments, inserting the plurality of conductive elements into passages of the housing comprises positioning contact surfaces on the contact portions within a slot in a second face of the housing.

Some embodiments relate to a connector. The connector comprises a housing comprising a first face and a second face, parallel to the first face. The housing comprises a plurality of passages comprising first openings accessible through the first face. The second face comprises at least one second opening configured to receive a mating component. The plurality of passages extend from the first face to the second face. The connector comprises a plurality of conductive elements disposed within passages of the plurality of passages. The plurality of conductive elements comprise contact tails extending from the housing through the first openings and contact portions exposed in the at least one second openings. The connector comprises a cover attached to the housing at the first face. The cover is configured to at least partially cover the first openings such that gaps from the first face into the plurality of passages have a width less than 0.1 mm.

In some embodiments, the gaps are configured to reduce by at least 75% a flow of vaporized flux into the passages when the connector is soldered to a printed circuit board with the cover attached relative to when the cover is not attached.

In some embodiments, the contact tails are through hole contact tails.

In some embodiments, the contact tails are surface mount contact tails.

In some embodiments, the first openings have an area larger than a cross-sectional area of a contact tail extending out of a respective first opening.

In some embodiments, the plurality of conductive elements comprise intermediate portions joining the contact tails and the contact portions. The plurality of conductive elements are disposed in a row having a row direction. The contact tails of adjacent conductive elements in the row are offset, relative to the intermediate portions, in opposite directions perpendicular to the row direction.

In some embodiments, the cover comprises a plurality of slots. The contact tails of a portion of the plurality of conductive elements are disposed within the plurality of slots.

The forgoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that more reliable connections between contacts on a card edge and conductive elements within a card edge connector may be formed with a bottom cover on the card edge connector. The bottom cover may block the migration of vaporized solder flux through passages between the bottom of the connector and contact surfaces of the conductive elements when the connector is soldered to a printed circuit board.

Such passages might be present in the card edge connector, for example, to enable insertion of the conductive elements into the housing during manufacture of the connector. Thus, the passages might be sized larger than the conductive elements and leave unfilled spaces at a board facing face of the connector when the conductive elements are inserted. Conventional connectors, without a bottom cover, allow vaporized flux to enter card receiving slots inside the conventional connectors through these unfilled spaces. The vaporized flux may cause contaminates to accumulate on contact surfaces of the conductive elements and cause failures to read cards inserted in the conventional connectors. Such contamination may interfere with operation of an electronic system. The contamination, for example, may cause intermittent failures, and those failures may be particularly disruptive for card edge connectors that receive a card with a relatively large number of dense contacts that carry high speed signals.

The inventors have recognized and appreciated that a bottom cover shaped and positioned to seal the unfilled spaces can block migration of vaporized flux into the connector. In some embodiments, such a seal may be formed with a bottom cover shaped and positioned with only small gaps between a board facing face of a connector housing and the bottom cover. The gaps may be, for example, not greater than 0.05 mm. In some embodiments, the gaps may be sufficiently small that they reduce by at least 75% the flow of vaporized flux into the passages when a connector is soldered to a printed circuit board with the cover attached relative to when the cover is not attached.

Figure 1A:
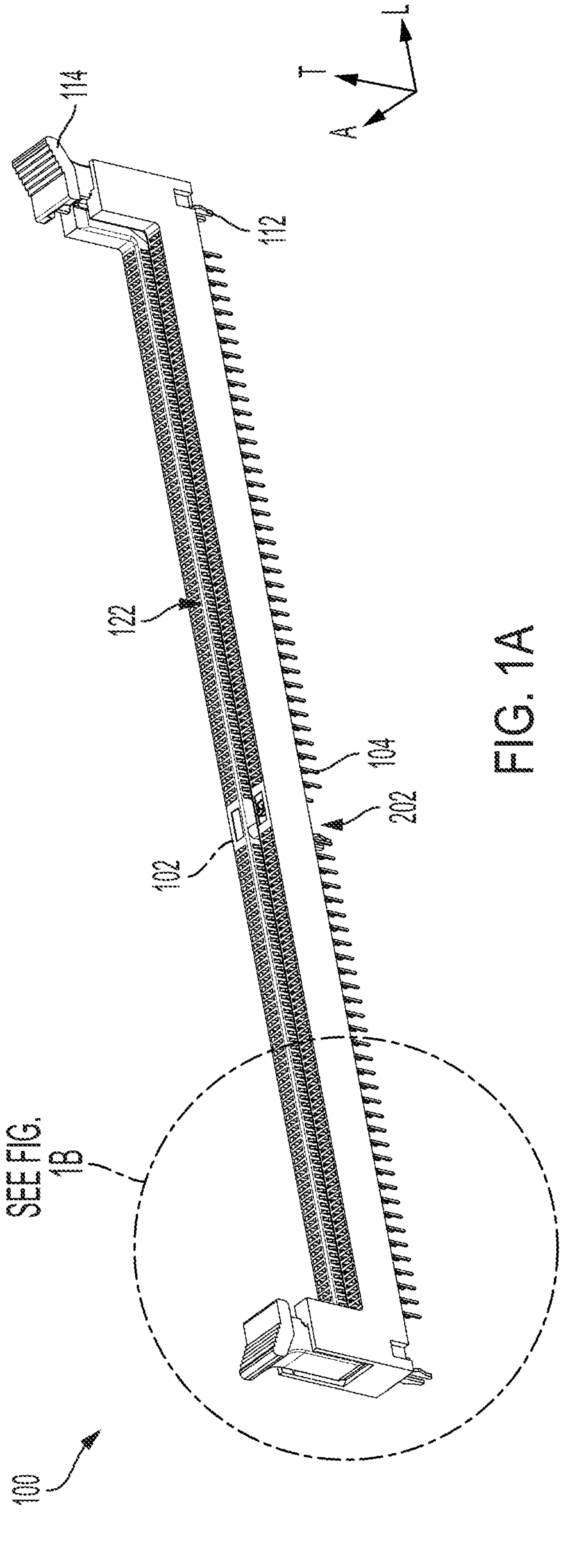
FIG. 1A is a top perspective view of a card edge connector, illustrating a slot configured to receive a card, according to some embodiments.

FIG. 1A depicts a top perspective view of a card edge connector 100, showing a slot 108 configured to receive a card, according to some embodiments. Card edge connector 100 is an example of a connector for which failures associated with vaporized solder flux migration may be ameliorated through the use of seal member. In this example, the connector has over 100 conductive elements configured in two rows for making contact to opposing sides of an inserted card. The card may generate and/or receive signals at high frequencies, up to 3 GHz, for example, or greater. The conductive elements may be sized and spaced to contact conductive pads on an edge of a card spaced by less than 1 mm, such as 0.8 mm or less. As a specific example, card edge connector 100 may be configured to receive a memory card according to the DDR4 standard.

Figure 1B:
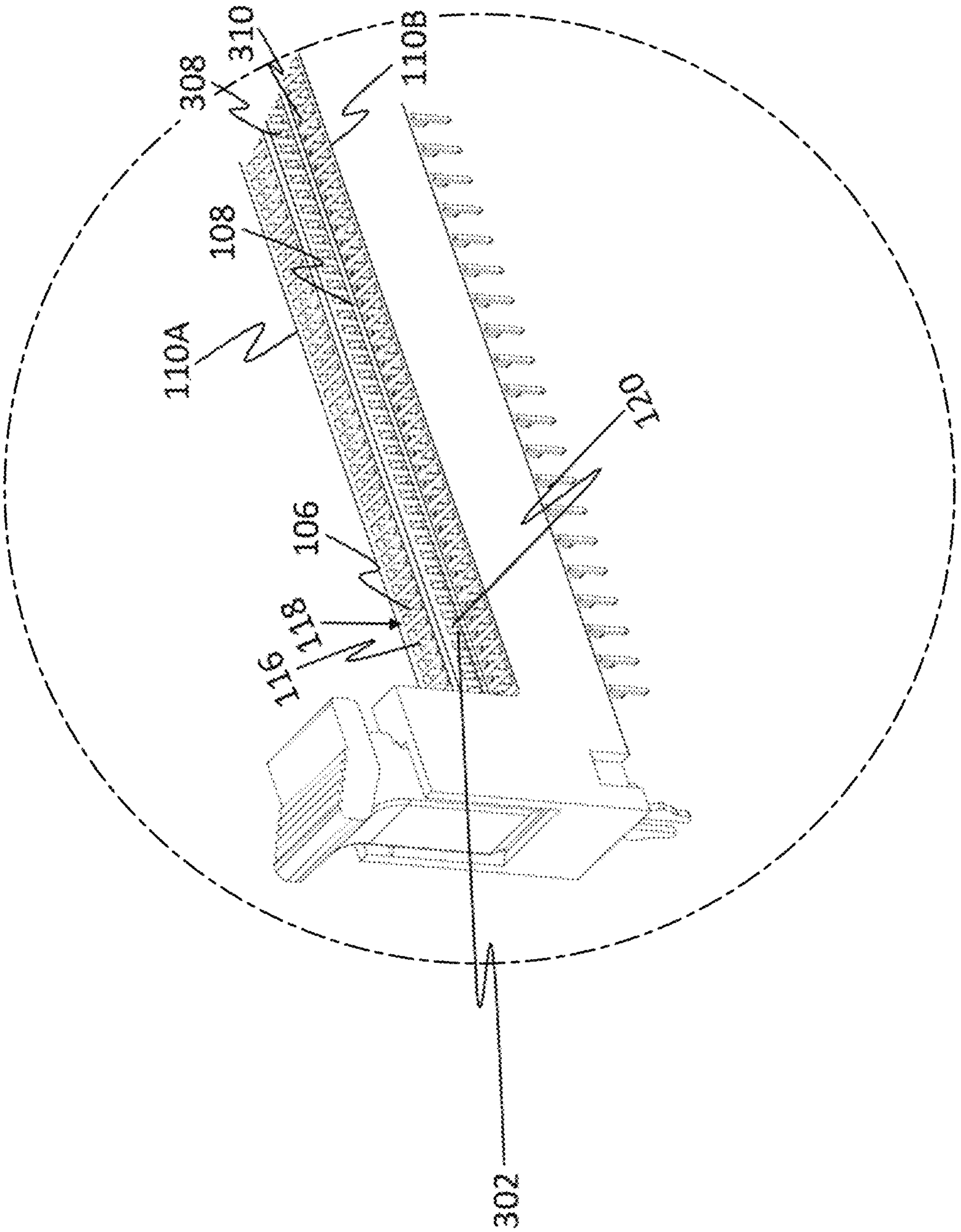
FIG. 1B is an enlarged view of a circled region 1B of the card edge connector of FIG. 1A.

FIG. 1B is an enlarged view of a circled region 1B of the card edge connector 100, according to some embodiments. The connector 100 may include a housing 102, a plurality of conductive elements 104 held by the housing 102, and a pair of latches 114 located at opposite ends of the housing 102 to latch a card into the connector. Connector 100 may also include forklocks 112, which are configured to retain the connector 100 at designed locations on a board that the connector 100 is mounted to. In this example, forklocks form a pressfit engagement in holes in the board. Such locking components may be used to position and hold connector 100 in place before and during a soldering operation in which tails of the conductive elements are soldered to the board.

Figure 3A:
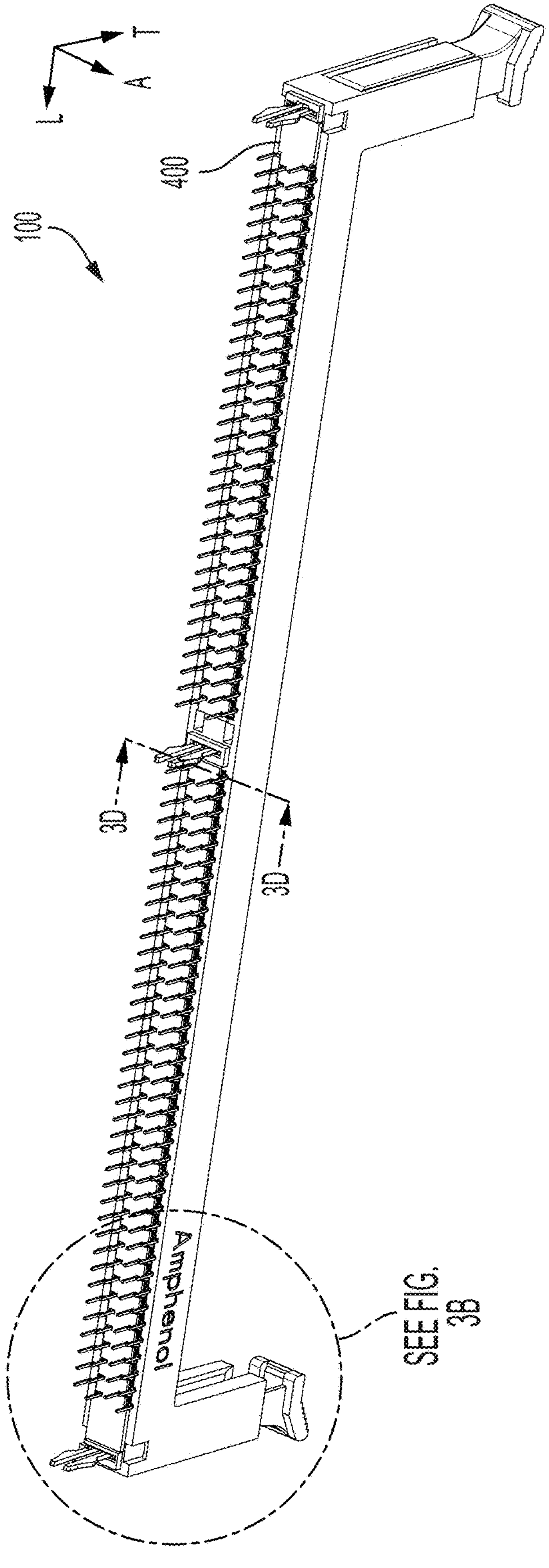
FIG. 3A is a bottom perspective view of the card edge connector of FIG. 1A, with seal members, illustrating a mounting interface configured for through hole soldering, according to some embodiments.
Figure 3B:
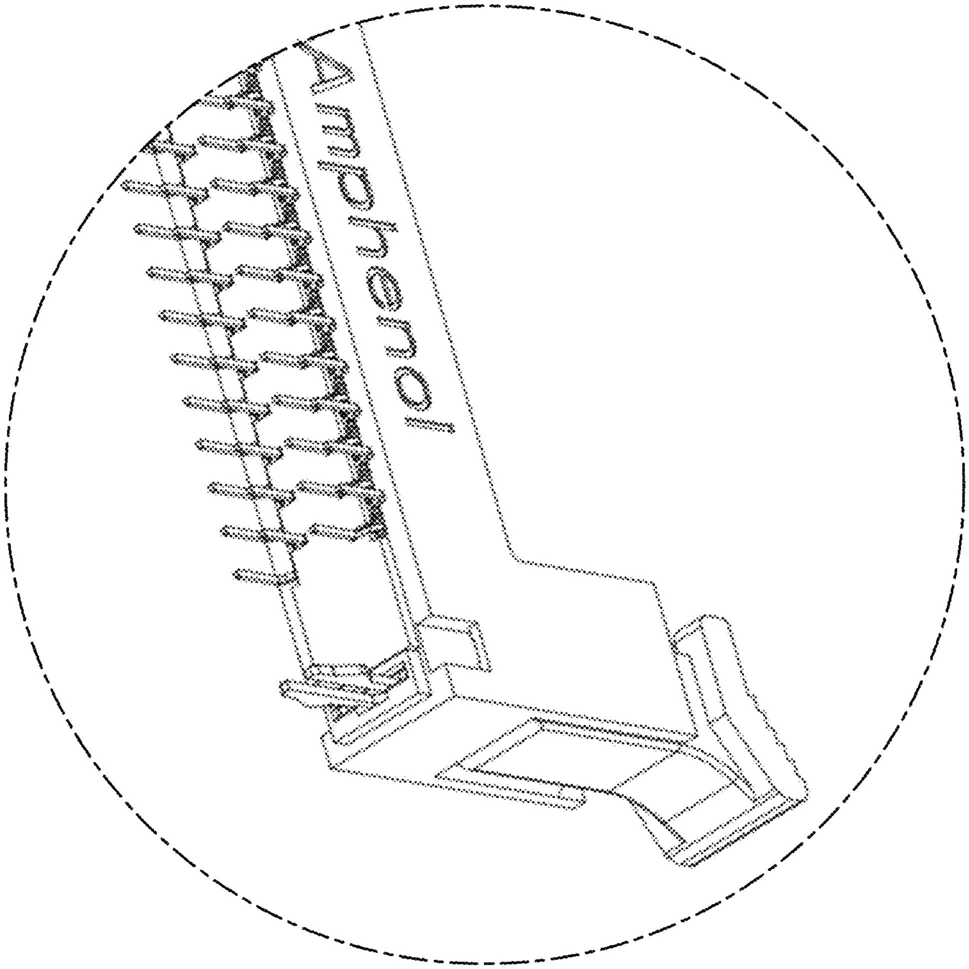
FIG. 3B is an enlarged view of a circled region 3B of the card edge connector of FIG. 3A.
Figure 3D:
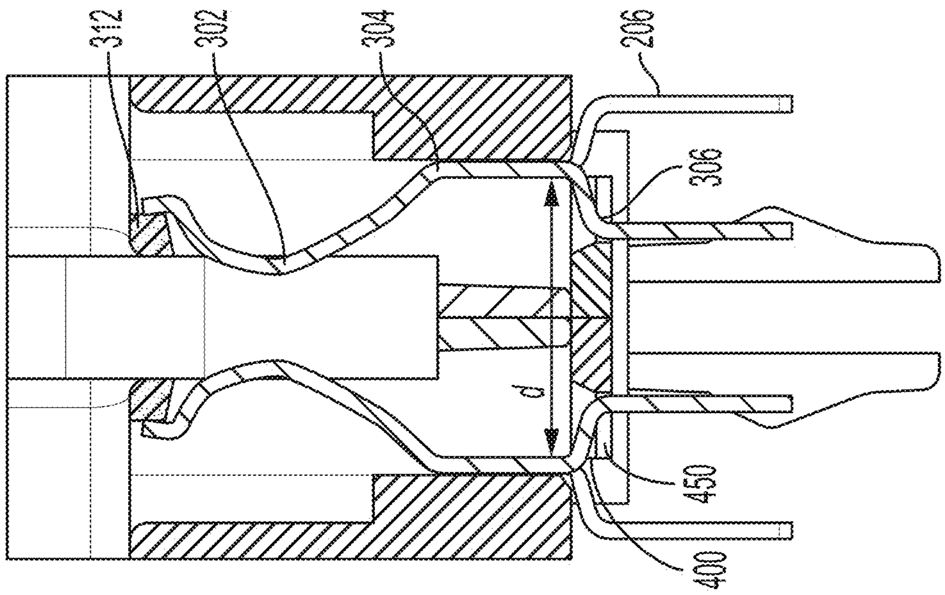
FIG. 3D is a cross-sectional view of the card edge connector of FIG. 3A along a line 3D.
Figure 5A:
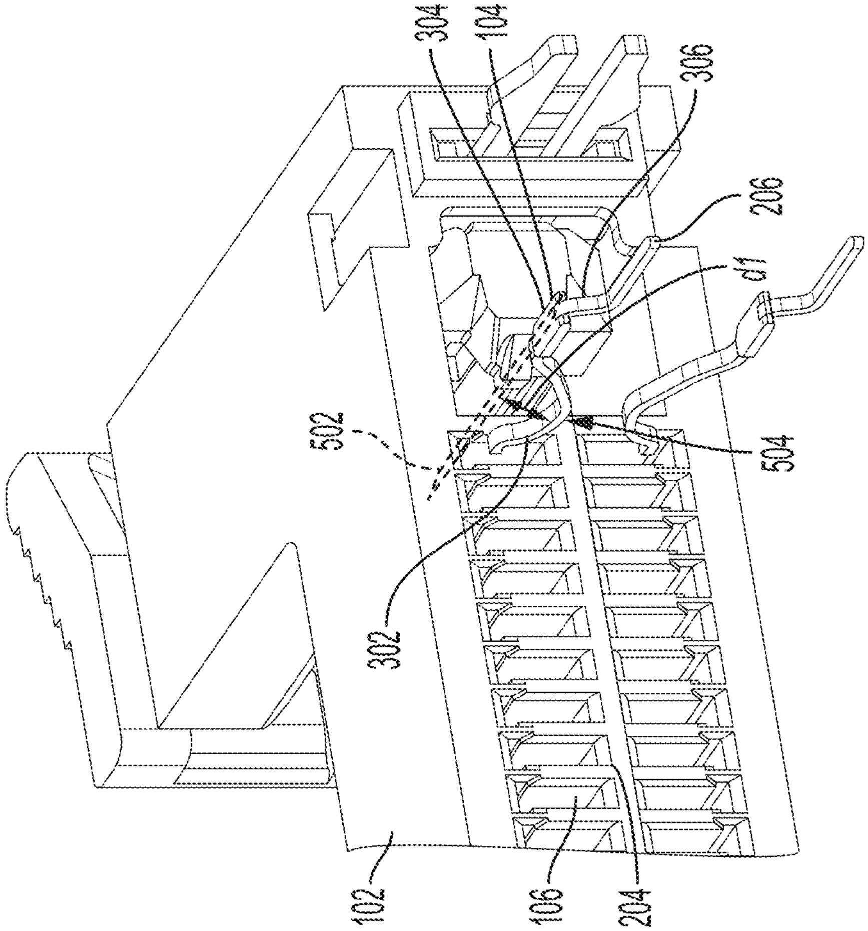
FIG. 5A is a partial perspective view of the card edge connector of FIG. 1A, illustrating inserting a conductive element into a connector housing, according to some embodiments.

Referring to FIG. 3D and FIG. 5A, which depict a cross-sectional view and a perspective view of a conductive element 104, respectively. The conductive element 104 may include a contact portion 302 curving inwardly relative to the slot 108 such that contact portion 302 is configured to make contact with contact pads on an edge of a card that is inserted into the slot 108. The conductive element 104 may also include a contact tail 206 configured to mount to a printed circuit board, which in this example may be inserting the tails 206 into holes in the printed circuit board and soldering the tails to the board. The conductive element 104 may further include an intermediate portion 304 between the contact portion 302 and the contact tail 206. The intermediate portion may have tabs, barbs or otherwise be wider than a passage 106 into which the conductive element is inserted such that the contact portion may be held within housing 102 by interference between the intermediate portion 304 and the walls of the passage 106. In some embodiments, a conductive element may include a transition portion 306 between the intermediate portion 304 and the contact tail 206 such that the contact tail extends to a hole on the printed circuit board, which may not be vertically aligned with the intermediate portion 304 in order to, for example, satisfy board design rules with closely spaced conductive elements. In some embodiments, the contact tail of adjacent conductive elements may be bent differently, increasing the center to center spacing of the contact tails. As a specific example, alternating contact tails along a row may be bent in opposite directions perpendicular to the row direction. Increasing the center to center spacing between contact tails that are inserted into holes in a printed circuit board similarly increases the center to center spacing of the holes, which may enable the board to be more reliably fabricated and/or fabricated at lower cost.

Referring back to FIG. 1A and FIG. 1B, the housing 102 may include wall 110A, wall 110B, a face 118 having at least one opening 122 configured to receive a mating component, for example, a card, and a face 202 parallel to the card facing face 118 and configured to face a printed circuit board that the connector 100 is mounted to. The walls 110A and 110B are elongated in a longitudinal direction L. The slot 108 may be between the walls 110A and 110B. The slot 108 may extend, from the at least one opening 122 of the card facing face 118, into the connector for a distance sufficient to receive a card edge, but not all the way through the board facing face 202 of the housing 102. The walls 110A and 110B may include passages 106 elongating in a transverse direction T perpendicular to the longitudinal direction L. The passages may extend for a distance longer than the distance of the slot 108 extends. In some embodiments, the passages may extend all the way through the housing 102, from the card facing face 118 to the board facing face 202. However, in some embodiments, the passages may not extend to card facing face 118.

In the illustrated example, each passage 106 holds one conductive element 104. The passage 106 has an opening 116 on a card facing face 118 of a wall 110A or 110B, and an opening 120 on a side of a wall 110A or 110B that faces the slot 108. Contact portions 302 of conductive elements 104 curve out of the openings 120 and into the slot 108. The plurality of conductive elements 104 are arranged in two rows 308 and 310. The conductive elements of rows 308 and 310 are configured to contact pads on opposing surfaces of a card that is inserted in the slot 108. Accordingly, multiple passages 106 are arranged in the walls 110A and 110B.

Figure 2A:
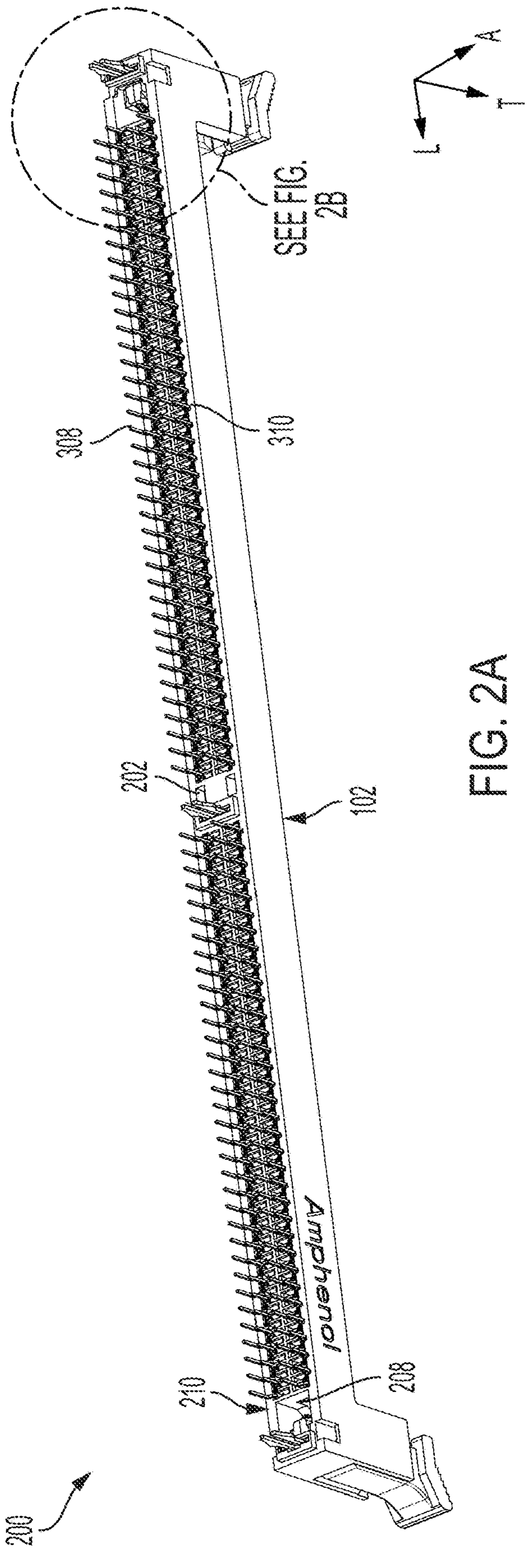
FIG. 2A is a bottom perspective view of the card edge connector of FIG. 1A with seal members removed, illustrating a mounting interface configured for through hole soldering, according to some embodiments.
Figure 2B:
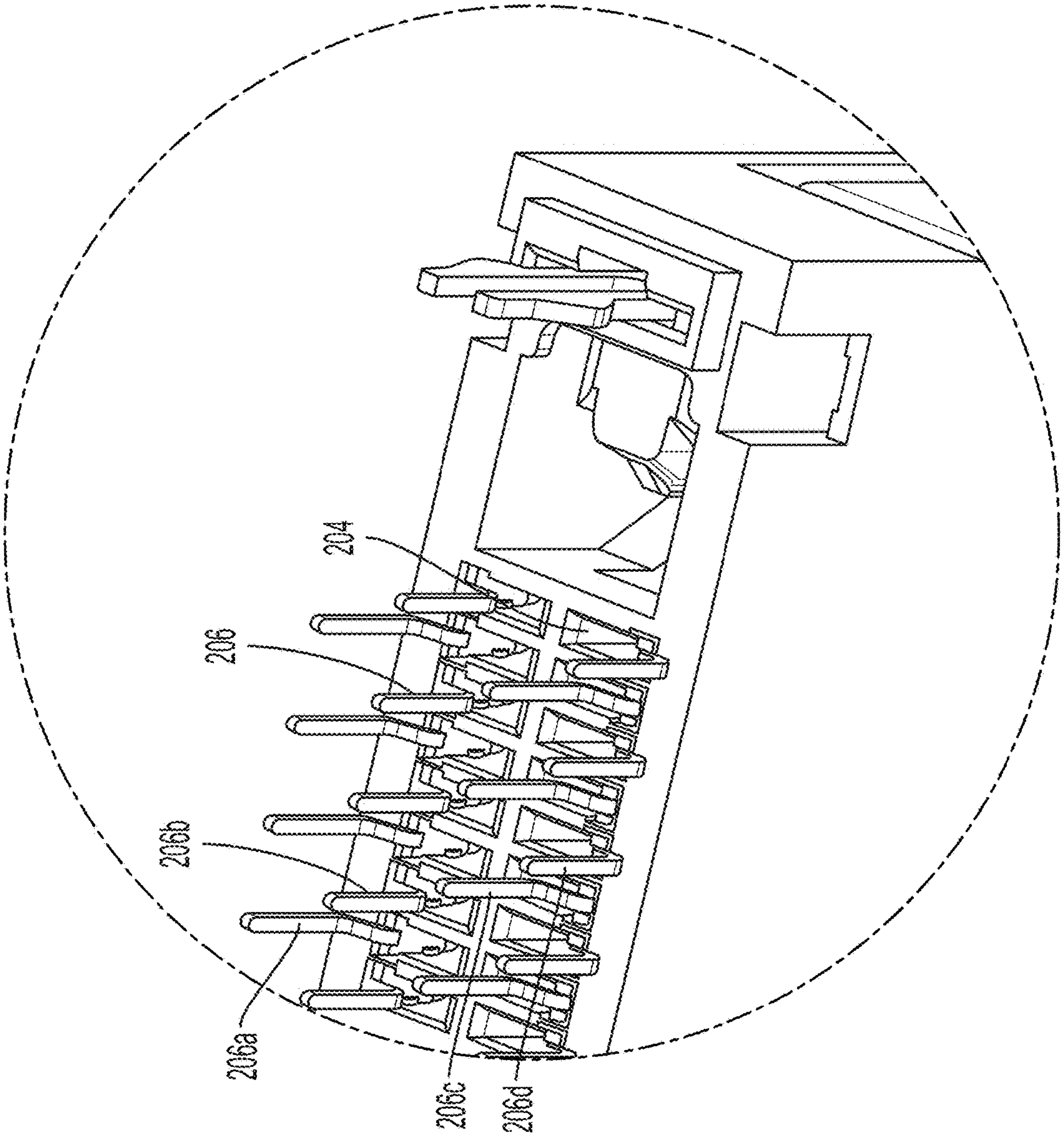
FIG. 2B is an enlarged view of a circled region 2B of the card edge connector of FIG. 2A.

FIG. 2A depicts a bottom perspective view of the card edge connector 100 with seal members removed and showing exposed bottom openings 204 of the housing 102. FIG. 2B depicts an enlarged view of a circled region 2B of the card edge connector 100. The housing 102 may include the mounting face 202 configured to face a printed circuit board that the connector 100 is mounted to. The passages 106 may include the openings 204 in the board facing face 202 of the housing 102. Contact tails 206 of the conductive elements 104 may extend out of the openings 204. The contact tails 206 may bend adjacent to the face 202 in a lateral direction A perpendicular to the longitudinal direction L and the transverse direction T. The contact tails 206 may be disposed in one or more rows that have a row direction. The contact tails of adjacent conductive elements in each row may be offset, relative to the intermediate portions, in opposite directions perpendicular to the row direction.

In the illustrated example, the conductive elements 104 in the first row 308 include a first plurality of contact tails 206*a* that bend in a first direction and a second plurality of contact tails 206*b* that bend in a second direction opposite the first direction. The contact tails 206*a* and 206*b* alternate along the row. The conductive elements 104 in the second row 310 include a third plurality of contact tails 206*c* that bend in the first direction and a fourth plurality of contact tails 206*d* that bend in the second direction. The third plurality of contact tails 206*c* are aligned with respective contact tails 206*a* of the first row 308 in the lateral direction A. The fourth plurality of contact tails 206*d* are aligned with respective contact tails 206*b* of the first row 308 in the lateral direction A.

Bending the contact tails such that adjacent contact tails are offset in different directions relative to the row direction increases the center to center spacing of the contact tails, and therefore of the holes in the circuit board that receive the contact tails. Board manufacturing processes generally have design rules that specify a minimum distance between plated holes in a circuit board, with more expensive processes needed to have smaller distances. Offsetting adjacent contact tails enables the center to center distance between the intermediate portions and mating contact portions to be smaller than the center to center spacing of the holes for the contact tails. Closer spacing of the mating contact portions than the minimum distance between plated holes is therefore possible. This configuration of the contact tails 206 enables a compact footprint of through holes on a printed circuit board that the connector 100 is configured to mounted to. Spacing of mating contact portions along the rows may be small—for example less than 1 mm or 0.8 mm or less, for example.

The openings 204 may have an area larger than cross-sectional areas of the contact tails extending therefrom. Referring to FIG. 5A, illustrating inserting a conductive element 104 into a passage 106 of a connector housing 102, the openings 204 may be sized and shaped such that the conductive element 104 can be inserted into the passage 106. In the illustrated example, the intermediate portion 304 of the conductive element 104 extending in a plane 502, which may be perpendicular to the board facing face 202. The contact portion 302 extends from the intermediate portion 304 and curves out of the plane 502 by a first distance dl in a first direction perpendicular to the plane 502.

The passage 106 has a dimension in the first direction smaller than the first distance dl such that contact surface 504 of the contact portion 302 can curve into the slot 108 through the side opening 120. The contact portion 302 enters the passage 106 through the opening 204 before the intermediate portion 304. This insertion order enables a shelf 312 (shown in FIG. 3D), which projects into the passage 106 adjacent to the opening 116 in the card facing face 118 and makes the opening 116 effectively smaller than the openings 204. The shelf 312 may be configured to hold a tip of the conductive element 104 such that the contact portion 302 of the conductive element 104 are positioned to apply a desired force to a card inserted into the slot 108.

Passage 106 is shown with a dimension in the first direction larger than the thickness of intermediate portion 304. That dimension ensures that there is space for the conductive element, with curves to form a mating contact surface, to fit within the passage and have clearance to deflect towards intermediate portion 304 when a card is inserted into the slot. Referring back to FIG. 2B, it can be seen that the openings 204 may have unfilled spaces after the conductive elements inserted into the passages 106, through which vaporized solder flux may enter the connector. The vaporized solder flux may pass the side openings 120, travel to the contact surfaces 504, and accumulate on the contact surfaces 504, which may cause interconnection failures between contact pads at a card edge and the contact surfaces.

A seal member may be attached to the bottom of the housing 102 such that the openings 204 are at least partially covered. The seal member may include a first surface configured to face a printed circuit board that the connector is mounted to and a second surface configured to face the housing. The housing 102 may include a standoff 208 that has a surface 210 parallel to the board facing face 202. In some embodiments, the standoff surface 210 may extend in a same plane of the board facing face 202. In some embodiments, the standoff surface 210 may extend in a plane offset from a plane that the board facing face 202 extends. In some embodiments, one of the first surface and the second surface may be flush with the standoff surface 210.

The seal member may fit closely to surfaces of the connector housing and conductive elements 104 bounding the unfilled portions of the openings 204. A close fit may leave only a small gap between the seal member and the connector components, such as less than 0.1 mm at any point around the perimeter of the unfilled portion of openings 204, or less than 0.08 mm in some embodiments or less than 0.05 mm in some embodiments. In some embodiments, the average width of a gap around a perimeter of an unfilled portion of the openings 204 may be similarly small, such as less than 0.1 mm or 0.08 mm or less than 0.05 mm or less than 0.03 mm. That close spacing may reduce to a large extent the amount of vaporized flux that passes through openings 204. The reduction may be, for example, greater than 75%, or greater than 80%, or greater than 85% or greater than 90% or greater than 95% in some embodiments.

Figure 3C:
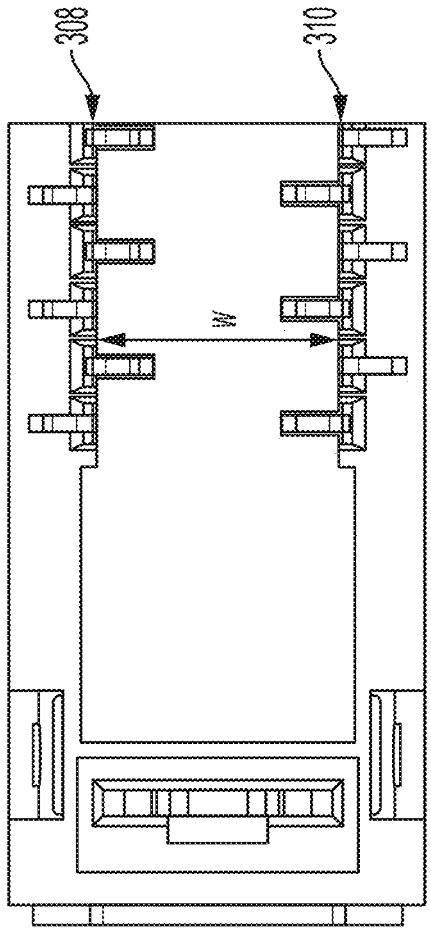
FIG. 3C is a partial bottom plan view of the card edge connector of FIG. 3A.
Figures 4A, 4B:
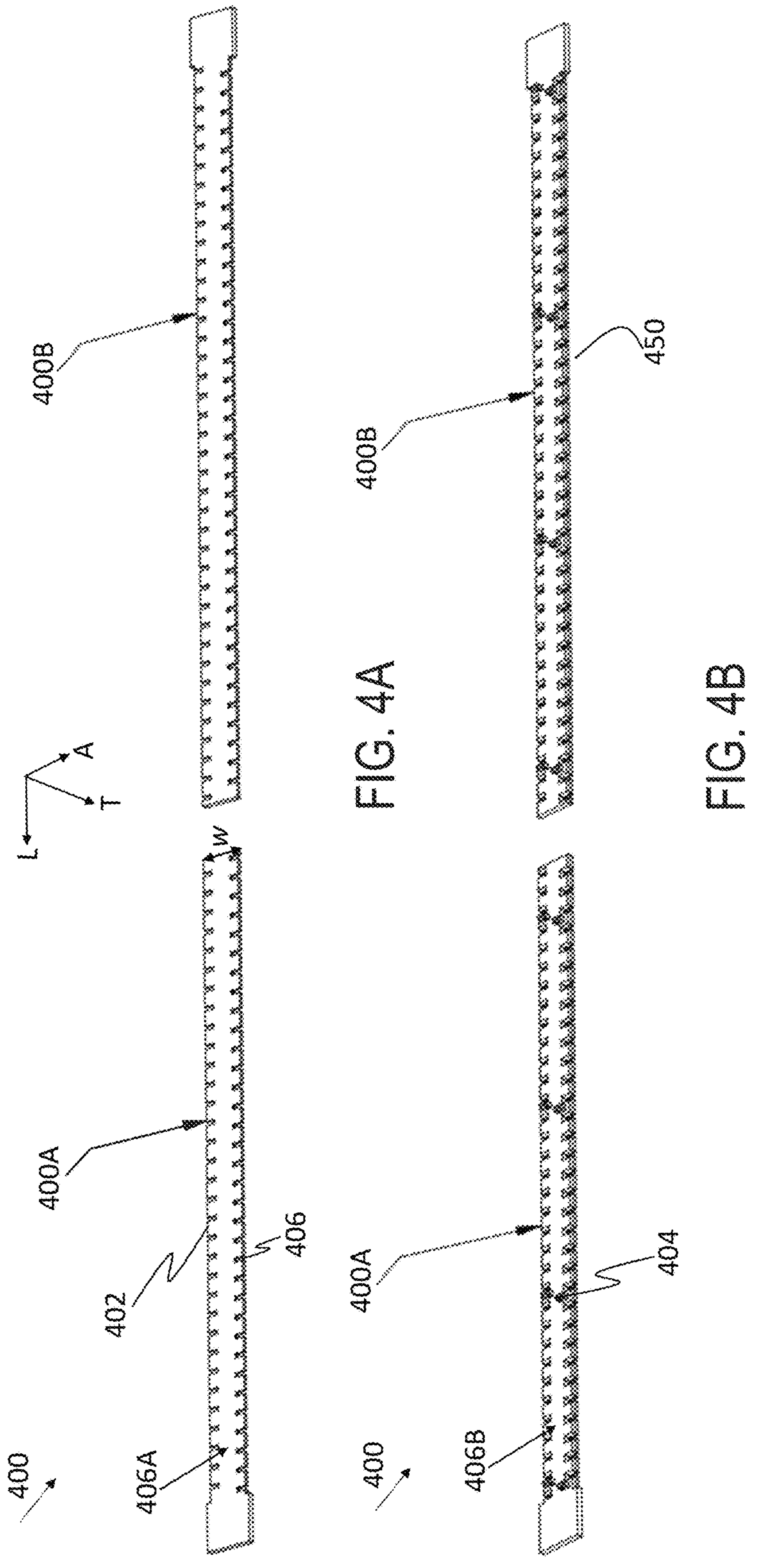
FIG. 4A is a perspective view of seal members of the card edge connector of FIG. 1A, illustrating a first surface configured to face a printed circuit board, according to some embodiments.
FIG. 4B is a perspective view of the seal members of FIG. 4A, illustrating a second surface configured to face a housing of the connector of FIG. 1A.

Exemplary seal members 400 are depicted in FIG. 3A, which shows a bottom perspective view of the card edge connector 100, with the seal members 400. FIG. 3B depicts an enlarged view of a circled region 3B of the card edge connector 100. FIG. 3C and FIG. 3D depict a partial bottom plan view and a cross-sectional view of the card edge connector 100, respectively. FIG. 4A and FIG. 4B depict perspective views of the seal members 400 of the card edge connector 100, illustrating a first surface 406A configured to face a printed circuit board that the connector 100 is mounted to and a second surface 406 configured to face a housing of the connector 100, respectively.

The seal members 400 may extend in the longitudinal direction L and have a width w along the lateral direction A. The width w may be substantially equal to a distance between the first row 308 and the second row 310 at the board facing face 202 of the housing 102 such that the openings 204 are substantially covered by the seal members 400. The seal members 400 may include recesses 406 between cover portions 402. The recesses 406 may be sized substantially equal to the bent portions of the conductive elements such that the seal members blocks portions of the openings 204 that are not occupied by the conductive elements.

The seal members 400 may include features for attachment of the seal member to the housing. In the illustrated embodiment, the seal member includes projections 404, which here are configured to extend into some of the passages 106 through the respective openings 204 at the board facing face 202 of the housing 102 such that the seal members 400 are attached to the board facing face 202. Any gap between the seal member and housing may be small, such as for example, not greater than 0.05 mm between the seal members 400 and the face 202. It should be appreciated that although the illustrated seal members 400 are two pieces, a seal member for a connector may be a unitary piece or include more than two separate pieces. The separate pieces may or may not extend by a similar length.

Though FIG. 3D illustrates edge 450 being perpendicular to both the board facing surface and the housing facing surface, other configurations may be used. The edges 450 of seal members 400 may be shaped to promote a tighter fit between the seal members 400 and the connector. For example, edge 450 may be tapered inwards from the board facing surface to the housing facing surface. In such an embodiment, the edge 450 may make an angle greater than or less than 90 degrees with respect to the board facing surface and the housing facing surface. That angle may deviate from 90 degrees to provide a taper between 5 and 15 degrees, for example.

Figure 5B:
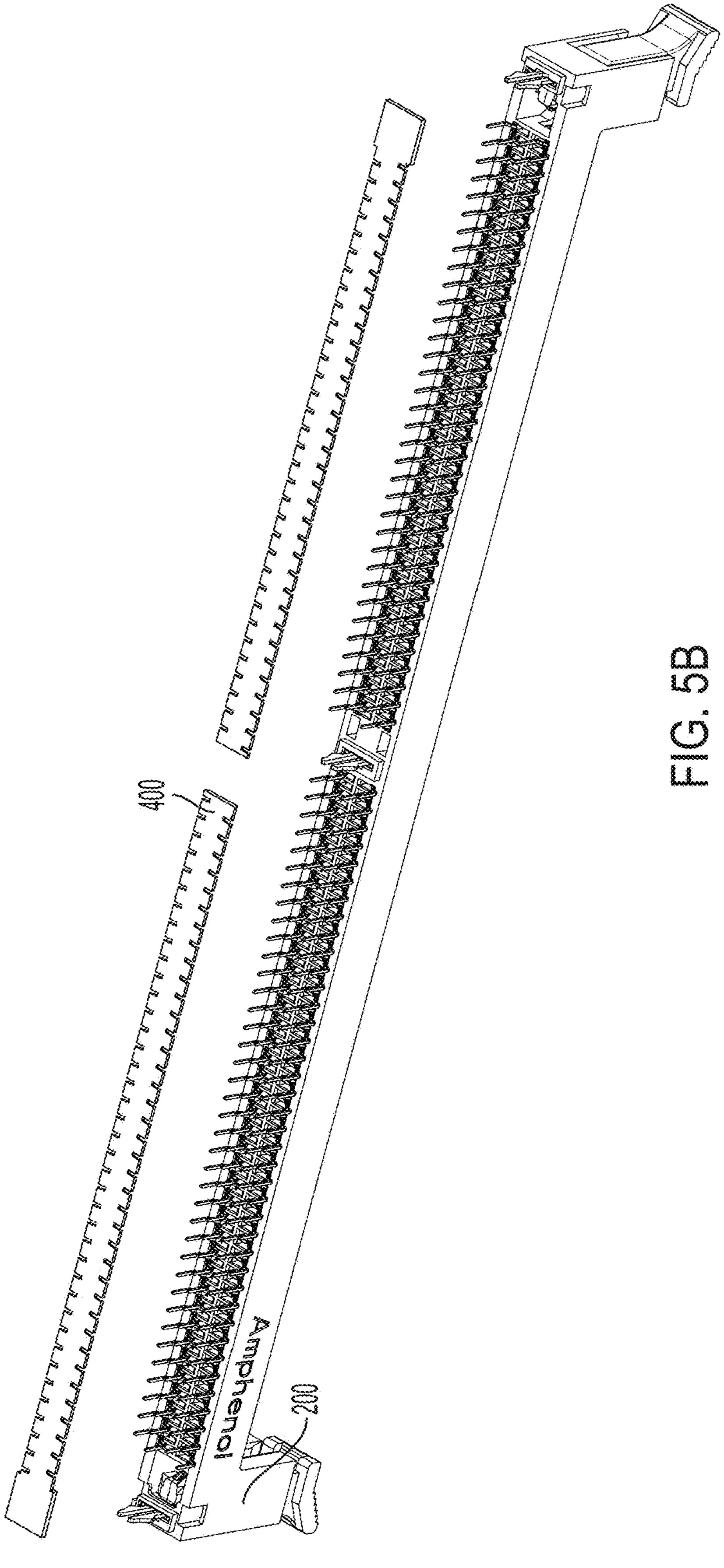
FIG. 5B is a bottom perspective view of the card edge connector of FIG. 1A, illustrating assembling a seal member to a board facing surface of the connector housing of FIG. 5A, according to some embodiments.

A method of manufacturing the connector 100 may include molding a housing 102 with passages 106, inserting the conductive elements into the passages 106 such that the contact tails 206 extend out of the openings 204 in the board facing face 202, and attaching a seal member 400 to the housing 102 such that the openings 204 are at least partially covered. FIG. 5A illustrates an example of inserting a conductive element 104 into a passage 106. FIG. 5B illustrates an example of assembling the seal members 400 to the board facing surface of the connector housing 102.

The method of manufacturing the connector 100 may include engaging the intermediate portions 304 of the conductive elements 104 with bounding walls of the passages 106, which may occur before attaching the seal members 400. FIG. 3D depicts the intermediate portions 304, with barbs projecting in a direction perpendicular with a broadside of the conductive element engaged with bounding walls of respective passages, according to some embodiments. In other embodiments, conductive elements may engage the walls of passages 106 in other ways, such as with barbs extending from the edges of conductive elements 104.

Attaching the seal members 400 may include aligning edges of the seal members with the contact tails 206 of the conductive elements 104 extending out of the boarding facing face 202 of the housing 102, for example, including aligning the recesses 406 with respective contact tails. Attaching the seal members 400 may include, for example, pressing the projections 404 into openings in housing 102. Those openings may be, in some embodiments, passages 106 of the housing 102, which have respective openings 204. Seal members 400 may be attached to housing 102 such that there is no more than a small gap, for example, not greater than 0.05 mm between the seal members and the housing. A similarly small gap may be formed between the seal member and the conductive elements, or any other structure partially filling openings 204.

Although FIGS. 1A-5B illustrate the exemplary connector 100 having through-hole contact tails, the present application is not limited to through-hole contact tails. In some embodiments, the contact tails may be surface mount contact tails. FIGS. 6A-9B illustrate an exemplary card edge connector 600 having surface mount contact tails. One or more seal members may be used with such edge connectors to reduce contamination of contact surfaces with vaporized solder flux.

Figure 6A:
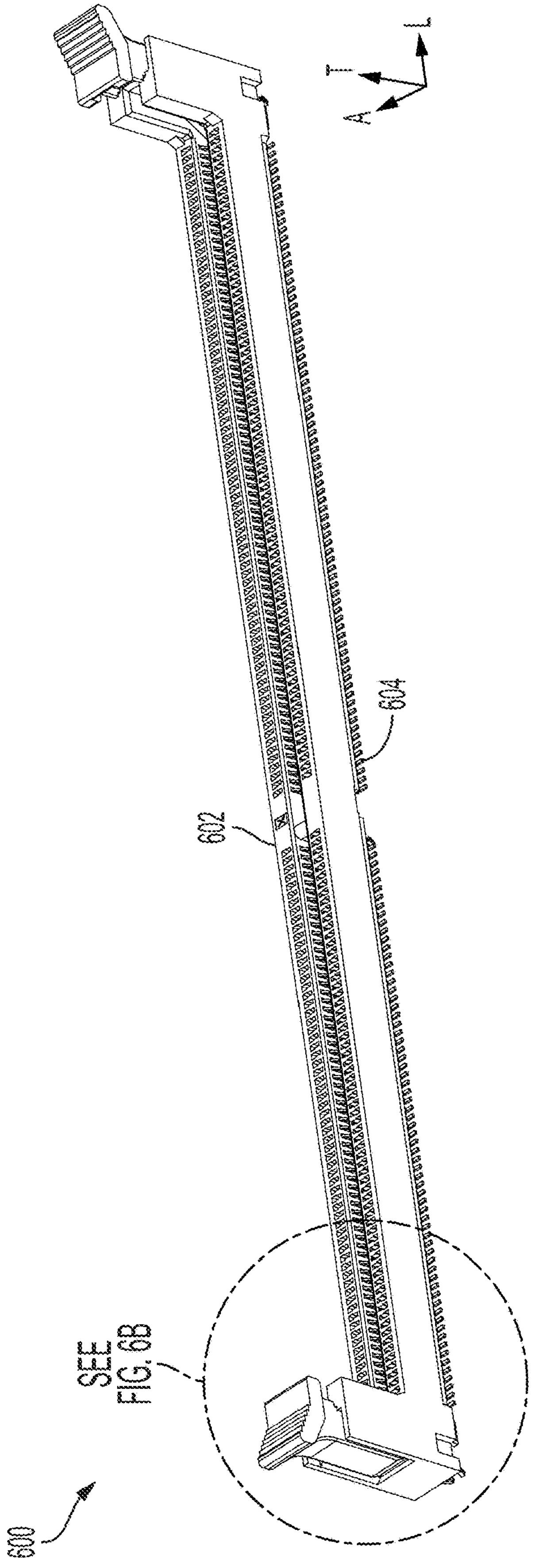
FIG. 6A is a top perspective view of a card edge connector, illustrating a slot configured to receive a card, according to some embodiments.
Figure 6B:
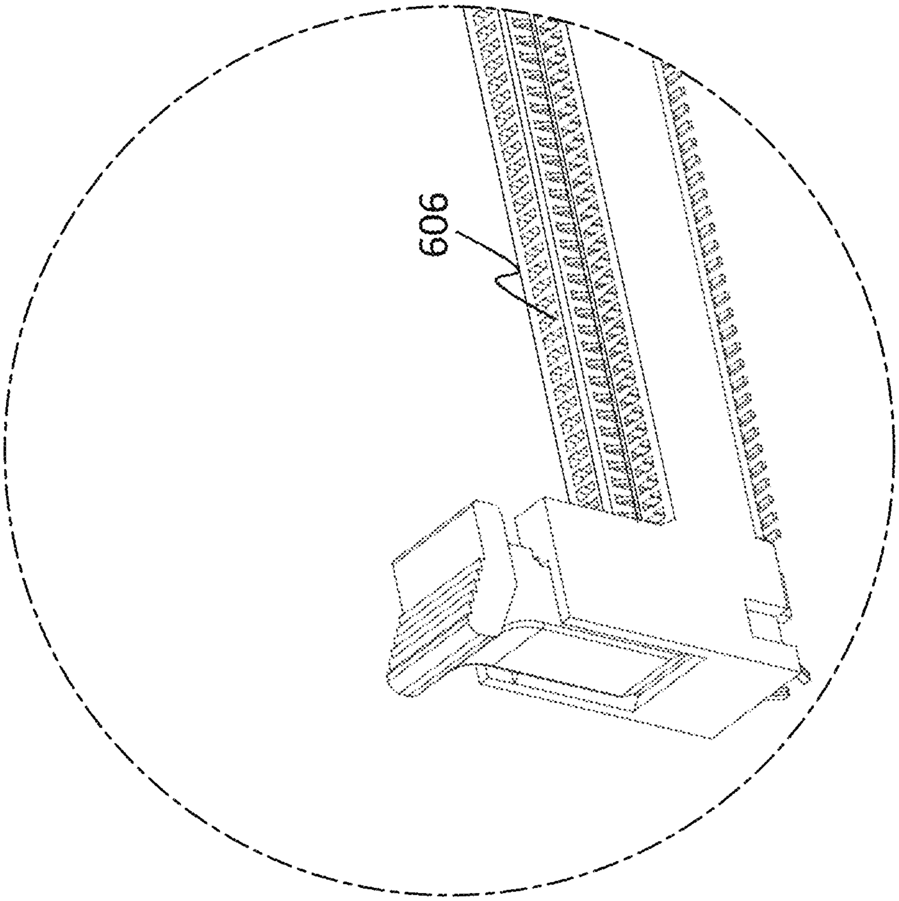
FIG. 6B is an enlarged view of a circled region 6B of the card edge connector of FIG. 6A.
Figure 7A:
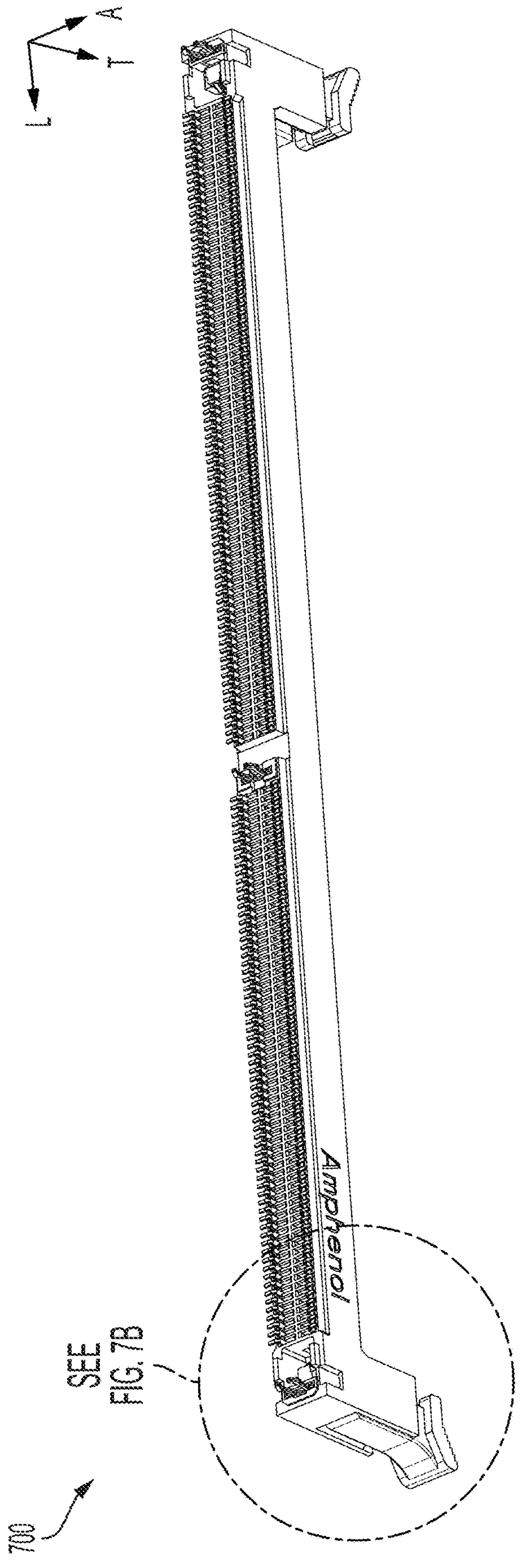
FIG. 7A is a bottom perspective view of the card edge connector of FIG. 6A with seal members removed, illustrating a mounting interface, according to some embodiments.
Figure 7B:
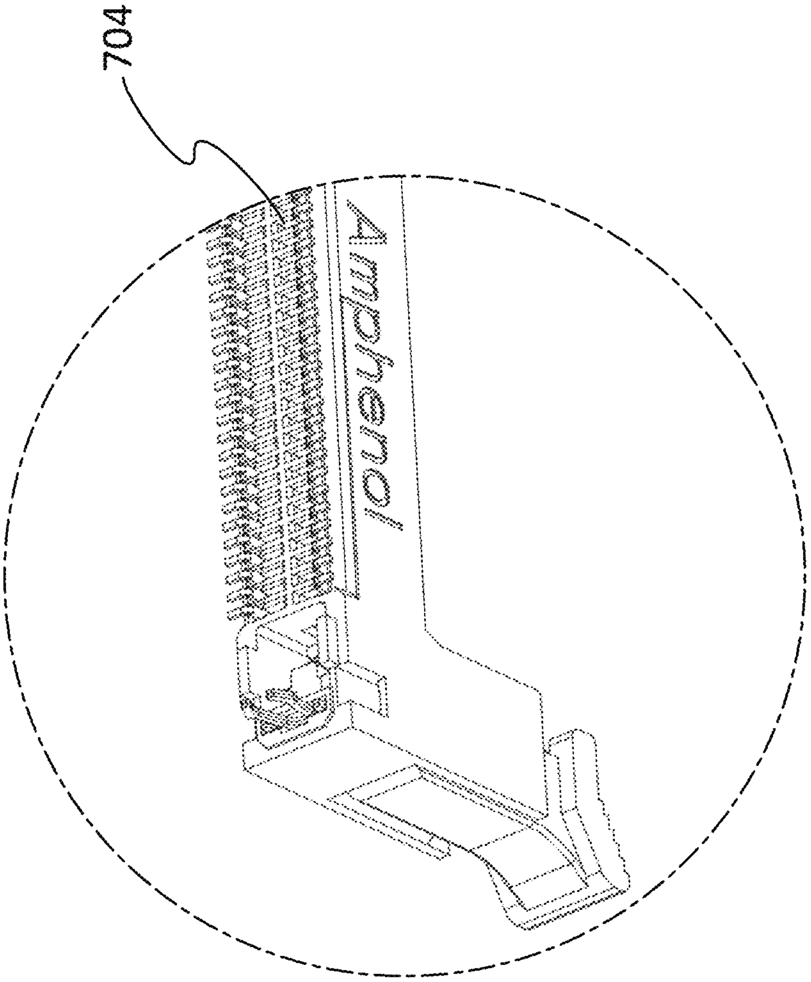
FIG. 7B is an enlarged view of a circled region 7B of the card edge connector of FIG. 7A.
Figure 8A:
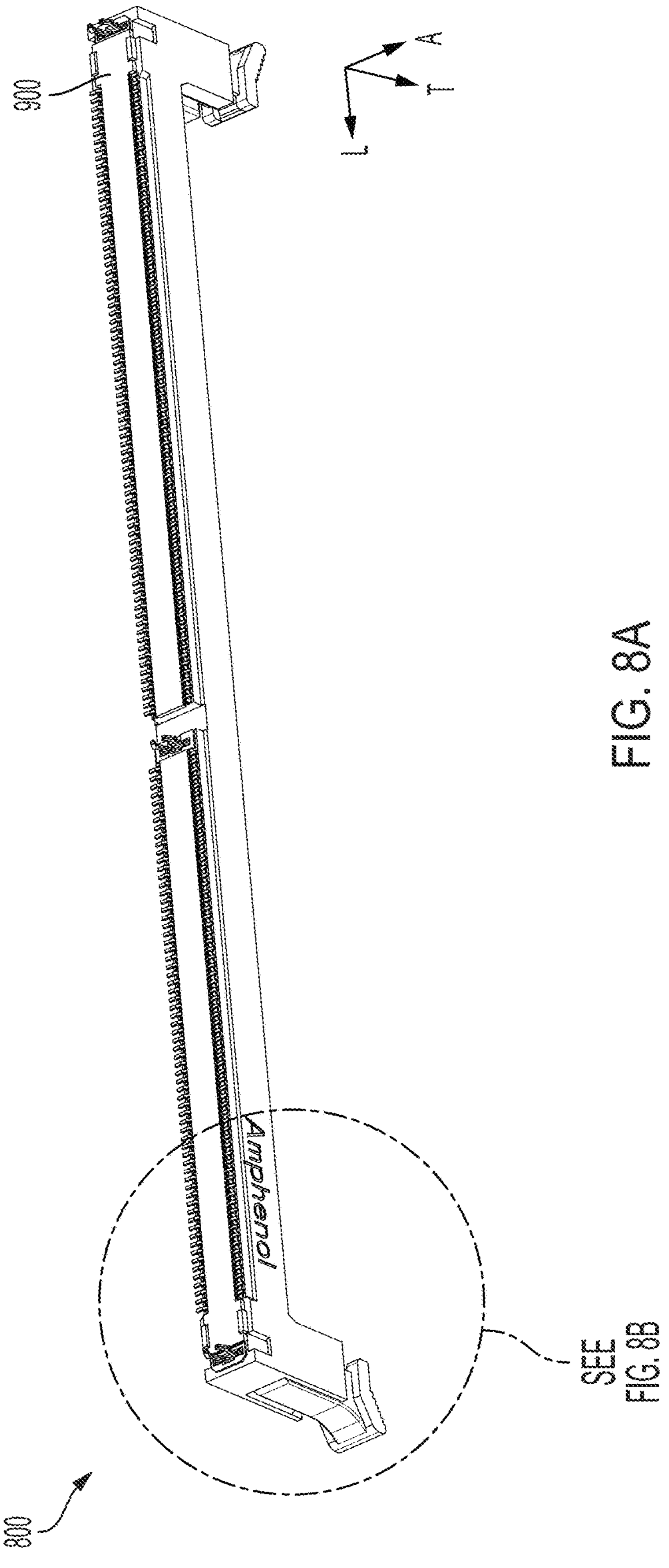
FIG. 8A is a bottom perspective view of the card edge connector of FIG. 6A, with seal members, illustrating a mounting interface configured for surface mount soldering to a printed circuit board, according to some embodiments.
Figure 8B:
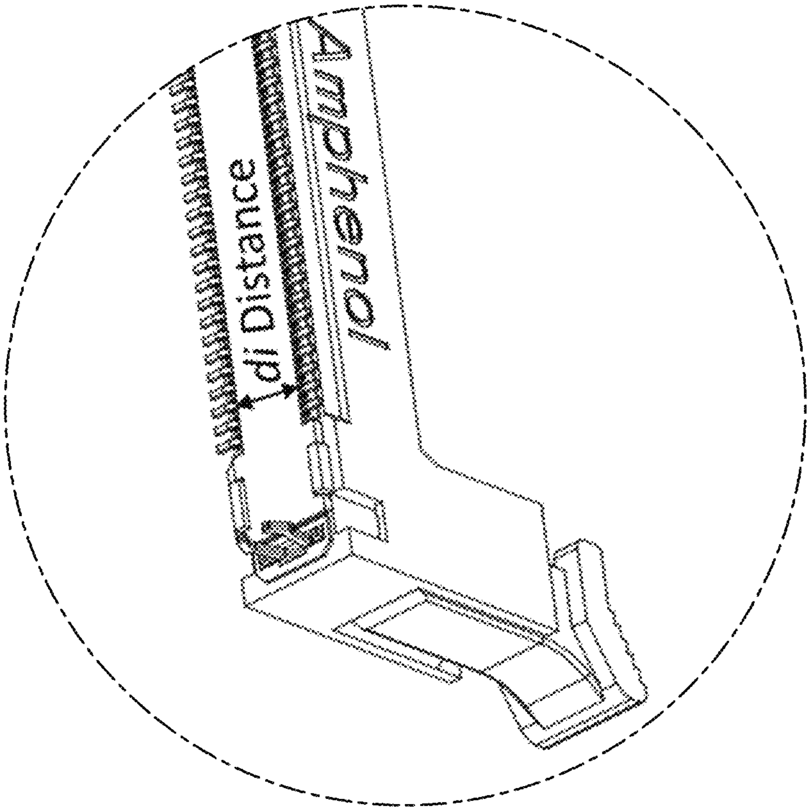
FIG. 8B is an enlarged view of a circled region 8B of the card edge connector of FIG. 8A.
Figure 9A:
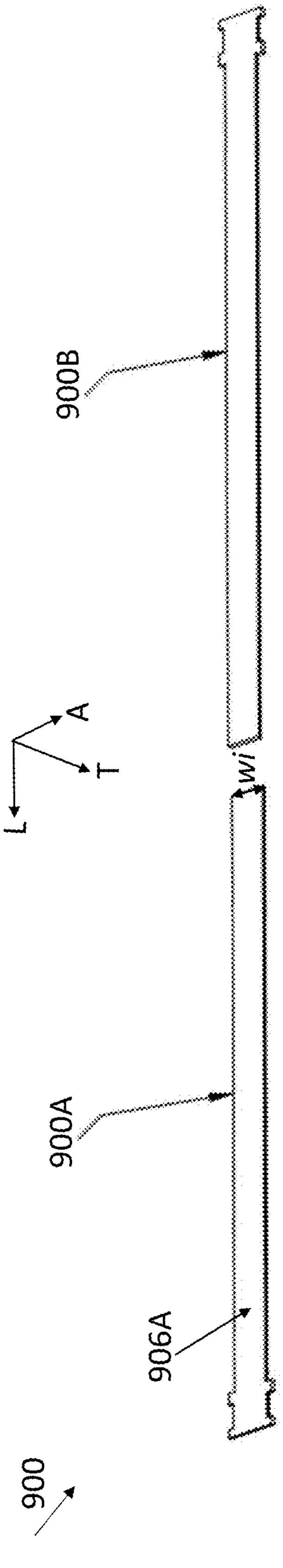
FIG. 9A is a perspective view of seal members of the card edge connector of FIG. 6A, illustrating a first surface configured to face a printed circuit board, according to some embodiments.
Figure 9B:
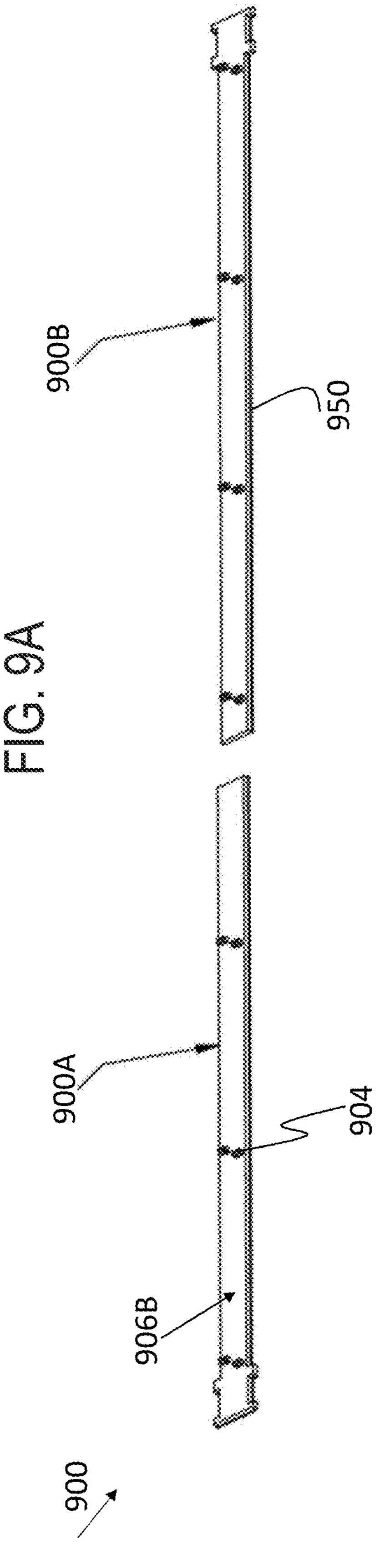
FIG. 9B is a perspective view of seal members of FIG. 9A, illustrating a second surface configured to face a housing of the connector of FIG. 6A.

FIG. 6A depicts a top perspective view of the card edge connector 600, illustrating a slot configured to receive a card. FIG. 6B depicts an enlarged view of a circled region 6B of the card edge connector 600. FIG. 7A depicts a bottom perspective view of the card edge connector 600 with seal members removed. FIG. 7B depicts an enlarged view of a circled region 7B of the card edge connector 600. FIG. 8A depicts a bottom perspective view of the card edge connector 600, with seal members 900. FIG. 8B depicts an enlarged view of a circled region 8B of the card edge connector 600. FIG. 9A and FIG. 9B depict perspective views of seal members 900 of the card edge connector 600, illustrating a first surface 906A configured to face a printed circuit board and a second surface 906B configured to face a housing 602 of the connector 600, respectively.

The connector 600 may include passages 606 in the housing 602 and conductive elements 604 held in the passages 606. The housing 602 may include openings 704 on a board facing face. The openings 704 may have an area larger than a cross-sectional area of contact tails extending out of respective openings 704. The seal members 900 may be attached to the board facing face of the housing 602 to block migration of vaporized solder flux into the connector 600 from the openings 704. The seal members 900 may extend in the longitudinal direction L and have a width wi in the lateral direction A. The width wi of the seal members 900 may substantially equal to a distance di between two rows of the contact tails of the conductive elements 604 such that the openings 704 are substantially covered.

The seal members 900 may be made of materials as described above as suitable for use in making a seal. They may be attached to housing 602 using techniques as described above. For example, projections 904 may be inserted into openings of the housing. Similarly to as described above, the seal members may be made in multiple pieces, such as 900A and 900B formed in a surface 906B facing the connector housing.

Surface 906A, facing the printed circuit board, may be flush with standoffs in the connector housing or may be set back from the surfaces of the standoffs such that the seal members do not impact separate of the connector from a board to which it is mounted, as shown for example, in FIG. 8B.

In the embodiment illustrated in FIGS. 9A and 9B, seal members 900 have straight edges 950 that are adjacent to contact tails, which is in contrast to the edges of seal members 400 which have periodic recesses 406 to receive contact tails that are offset. The edge profile of the shield may be configured to conform to the position of the contact tails at the location where a seal is formed between the seal member and the connector housing. The edge 950 may be tapered to promote a tighter fit between the seal member and the connector.

Although details of specific configurations of conductive elements and housing members are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art.

Various changes may be made to the illustrative structures shown and described herein. For example, the illustrated example shows two rows of conductive elements on opposed sides of a card receiving slot. However, a connector may include a single row of conductive elements according to some embodiments.

As an example of a variation, embodiments were described in which a seal, impeding the flow of vaporized solder flux into passages in a connector housing was formed by a seal member fitting with no more than a small gap at an opening to the passages. A seal might alternatively or additionally be formed at an interior portion of one or more of the passages, offset from the opening by a distance. That seal might be formed at a location between the contact tails and the contact surfaces. Further, a seal may be formed at distances from the opening of a passage that varies around the passage. In such an embodiment, the spacing between the seal member and the connector may be measured along a closed path around the perimeter of the passage. A metric of effectiveness of the seal may be, for example, the maximum spacing measured along a closed path that provides a choke point for vapor flow into the passageway. Alternatively or additionally, a metric of effectiveness may be the average gap between the seal member and other components of the connector around such a closed path. A closed path with the smallest average spacing may be used as an indicator of the effectiveness for the seal at blocking flow of vaporized flux.

As another example, a seal is described formed by attaching a pre-formed member to the connector housing. In alternative embodiments, the seal member may be formed in place, such as by depositing a curable material. In some embodiments, for example, assembly gaps may be sealed by using glue or liquid silicone rubber or other settable material that is positioned to seal the passages in the housing.

Further, a seal member made of a thermoplastic was described. A seal may be made with a combination of materials, such as may be made in a two-shot molding operation in which, in a first shot, a thermoplastic material, which cures to a more rigid portion of the seal, is formed. In a second shot, a more compliant material such as silicone, may be molded around perimeter of the more rigid portion.

As another example, an embodiment is illustrated in which each conductive element is inserted into a separate passage. In some embodiments, one or more conductive elements may be electrically connected together and may be inserted into the same passage. Alternatively or additionally, other structures may hold the conductive elements so that they are not in electrical contact. For example, portions of the conductive elements forming a row or a portion of a row may be held by an insulative member, which may be inserted into the housing with the conductive elements. The insulative member may have passages formed in it or may be molded around the conductive elements.

As a further variation, embodiments were illustrated in which a card edge connector has the same number of conductive elements in each of two parallel rows such that each conductive element is aligned with and faces a conductive element across the slot. In other embodiments, the rows may have different numbers or types of conductive elements. Alternatively or additionally, the rows of conductive element may be offset with respect to each other along the slot.

Further, a seal blocking the flow of vaporized solder flux was described. A seal as described herein may block the flow of other contaminants that may be generated during a soldering operation or at any other time during the manufacture or use of an electronic assembly contain that connector.

Furthermore, although many inventive aspects are shown and described with reference to a card edge connector, it should be appreciated that aspects of the present disclosure is not limited in this regard, as the techniques used to block vaporized flux into a connector described herein, whether alone or in combination with one or more other inventive concepts, may be used in other types of electrical connectors, such as backplane connectors, mezzanine connectors, cable connectors, stacking connectors, I/O connectors, chip sockets, etc.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

Such alterations, modifications, and improvements are intended to be within the spirit and scope of the invention. Accordingly, the foregoing description and drawings are by way of example only.

What is claimed is:

1. A connector comprising:

a plurality of conductive elements comprising contact tails configured to mount to a printed circuit board;

a housing comprising a face configured to face the printed circuit board and a plurality of passages holding the plurality of conductive elements, the plurality of passages comprising openings in the face, the openings having an area larger than a cross-sectional area of a contact tail extending out of a respective opening; and a member adjacent to the face of the housing, the member comprising portions sized and positioned to cover portions of respective openings that are not occupied by a conductive element, wherein the portions comprise edges tapered inwards from the face of the housing so as to promote a tighter fit between the member and housing.

2. The connector of claim 1, wherein: the plurality of conductive elements are disposed in first and second rows along a longitudinal direction, and the member has a length in the longitudinal direction and a width along a lateral direction perpendicular to the longitudinal direction.

3. The connector of claim 2, wherein: the width of the member along at least half of the length of the member is substantially equal to a distance between the first and second rows at the face of the housing.

4. The connector of claim 2, wherein: the plurality of conductive elements bend in the lateral direction adjacent to the face of the housing.

5. The connector of claim 4, wherein: the member comprises a plurality of recesses positioned to receive portions of the plurality of conductive elements bent in the lateral direction adjacent to the face of the housing, and the plurality of recesses are sized to receive the bent portions of the plurality of conductive elements such that the member impedes vaporized flux into the passages through the openings on the face of the housing.

6. The connector of claim 4, wherein: the edges are straight and continuous in the longitudinal direction.

7. The connector of claim 1, wherein: the member comprises a plurality of projections extending into the passages through the openings at the face of the housing such that the member is attached to the face of the housing with a gap not greater than 0.05 mm between the member and the face of the housing.

8. The connector of claim 1, wherein: the edges make an angle greater than or less than 90 degrees with respect to the face of the housing.

9. The connector of claim 8, wherein: the angle deviates from 90 degrees by an amount that is in a range of 5 to 15 degrees.

10. The connector of claim 1, wherein: the housing comprises a card facing face opposite the face, and the passages do not extend to the card facing face of the housing.

11. The connector of claim 1, wherein: the member comprises a rigid portion.

12. The connector of claim 11, wherein: the member comprises a compliant portion around the rigid portion.

13. A connector comprising:
a housing comprising a first face and a second face, parallel to the first face, wherein:
the housing comprises a plurality of passages comprising first openings accessible through the first face, and
the second face comprises at least one second opening configured to receive a mating component;
a plurality of conductive elements disposed within passages of the plurality of passages, wherein the plurality of conductive elements comprise contact tails extending from the housing through the first openings and contact portions exposed in the at least one second openings; and
a cover at least partially covering the first openings, the cover comprising a surface flush with the first face.

14. The connector of claim 13, wherein: gaps from the first face into the plurality of passages are configured to reduce by at least 75% a flow of vaporized flux into the passages when the connector is soldered to a printed circuit board with the cover relative to without the cover.

15. The connector of claim 13, wherein: the first openings have an area larger than a cross-sectional area of a contact tail extending out of a respective first opening.

16. The connector of claim 13, wherein: the plurality of conductive elements comprise intermediate portions joining the contact tails and the contact portions, the plurality of conductive elements are disposed in a row having a row direction, and the contact tails of adjacent conductive elements in the row are offset, relative to the intermediate portions, in opposite directions perpendicular to the row direction.

17. The connector of claim 16, wherein: the cover comprises a plurality of slots, and the contact tails of a portion of the plurality of conductive elements are disposed within the plurality of slots.

18. The connector of claim 13, wherein: the plurality of passages are disposed in first and second rows along a row direction, and the cover comprises edges extending continuously in the row direction.

19. The connector of claim 13, wherein: the plurality of passages extend from the first face to the second face, and the cover is attached to the housing at the first face such that gaps from the first face into the plurality of passages have a width less than 0.1 mm.

20. A connector comprising:
a plurality of conductive elements comprising contact tails configured to mount to a printed circuit board;
a housing comprising a face configured to face the printed circuit board and a plurality of passages holding the plurality of conductive elements, the plurality of passages comprising openings in the face, the openings having an area larger than a cross-sectional area of a contact tail extending out of a respective opening; and
a member attached to the face of the housing, the member comprising portions sized and positioned to cover portions of respective openings that are not occupied by a conductive element, wherein:
the portions of the member comprise edges tapered inwards from the face of the housing so as to promote a tighter fit between the member and housing; and
the face of the housing comprises a standoff comprising a surface parallel to the face, and the member comprises a surface flush with or set back from the surface of the standoff such that the member does not impact separation of the connector from the printed circuit board when the connector is mounted to the printed circuit board.

* * * * *